(12) United States Patent
Simpson

(10) Patent No.: US 10,787,586 B2
(45) Date of Patent: Sep. 29, 2020

(54) OPTICALLY TRANSPARENT SUPERHYDROPHOBIC THIN FILM

(71) Applicant: Waymo LLC, Mountain View, CA (US)

(72) Inventor: John T. Simpson, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/286,545

(22) Filed: Feb. 26, 2019

(65) Prior Publication Data

US 2019/0262861 A1    Aug. 29, 2019

Related U.S. Application Data

(60) Provisional application No. 62/635,993, filed on Feb. 27, 2018.

(51) Int. Cl.
  *C09D 127/12*    (2006.01)
  *C09D 7/20*    (2018.01)
  (Continued)

(52) U.S. Cl.
  CPC ........... *C09D 127/12* (2013.01); *B05D 1/005* (2013.01); *B05D 3/142* (2013.01); *B05D 5/083* (2013.01);
  (Continued)

(58) Field of Classification Search
  CPC .......... C09D 127/12; C09D 7/20; C09D 7/62; C03C 17/007; C03C 17/3405;
  (Continued)

(56) References Cited

U.S. PATENT DOCUMENTS

| 7,348,389 B2 | 3/2008 | Graham et al. |
| 8,580,027 B1 * | 11/2013 | Campos ................... C08K 9/08 |
| | | 106/287.13 |

(Continued)

FOREIGN PATENT DOCUMENTS

| CN | 105499092 A | 4/2016 |
| CN | 107267030 A | 10/2017 |
| WO | 2014035742 A2 | 3/2014 |

OTHER PUBLICATIONS

Simpson et al. "Superhydrophobic materials and coating: a review", Re. Prog. Phys. 78 (2015) 086501 (Year: 2015).*

(Continued)

*Primary Examiner* — Michael Bernshteyn
(74) *Attorney, Agent, or Firm* — McDonnell Boehnen Hulbert & Berghoff LLP

(57) ABSTRACT

A coating that can be easily applied, clear, well-bonded, and superhydrophobic is disclosed. In one aspect, a method for coating a substrate comprises providing a substrate having a surface, disposing a coating composition adjacent the surface, the composition comprising a hydrophobic fluorinated solvent, a binder comprising a hydrophobic fluorinated polymer, and hydrophobic fumed silica nanoparticles. Also disclosed is an article comprising a coating layer, the coating layer comprising a plurality of nanoparticles partially exposed on an outward surface thereof.

8 Claims, 3 Drawing Sheets

(51) Int. Cl.

| | |
|---|---|
| *C09D 7/62* | (2018.01) |
| *C03C 17/00* | (2006.01) |
| *C03C 17/34* | (2006.01) |
| *B05D 1/00* | (2006.01) |
| *B05D 3/14* | (2006.01) |
| *B05D 5/08* | (2006.01) |
| *B05D 7/24* | (2006.01) |
| *C08L 27/12* | (2006.01) |
| *C08K 3/36* | (2006.01) |
| *C08K 9/04* | (2006.01) |
| *C08K 9/08* | (2006.01) |
| *B05D 7/00* | (2006.01) |
| *C08K 7/22* | (2006.01) |

(52) U.S. Cl.
CPC ............... *B05D 7/24* (2013.01); *B05D 7/50* (2013.01); *C03C 17/007* (2013.01); *C03C 17/3405* (2013.01); *C08L 27/12* (2013.01); *C09D 7/20* (2018.01); *C09D 7/62* (2018.01); *B05D 2203/35* (2013.01); *B05D 2350/30* (2013.01); *B05D 2350/60* (2013.01); *B05D 2401/10* (2013.01); *B05D 2506/10* (2013.01); *B05D 2601/22* (2013.01); *C03C 2217/445* (2013.01); *C03C 2217/478* (2013.01); *C03C 2217/76* (2013.01); *C08K 3/36* (2013.01); *C08K 7/22* (2013.01); *C08K 9/04* (2013.01); *C08K 9/08* (2013.01); *C08K 2201/005* (2013.01); *C08L 2312/08* (2013.01)

(58) Field of Classification Search
CPC ........ C03C 2217/478; C03C 2217/445; C03C 2217/76; B05D 1/005; B05D 3/142; B05D 5/083; B05D 7/24; B05D 7/50; C08L 27/12; C08K 3/36; C08K 9/04; C08K 9/08; C08K 7/22
USPC ......................................................... 524/544
See application file for complete search history.

(56) References Cited

U.S. PATENT DOCUMENTS

| | | | |
|---|---|---|---|
| 8,679,578 B2* | 3/2014 | Akutagawa | C09D 127/20 427/162 |
| 8,741,158 B2 | 6/2014 | Aytug et al. | |
| 9,221,076 B2 | 12/2015 | Simpson et al. | |
| 9,752,049 B2 | 9/2017 | Armstrong et al. | |
| 9,771,656 B2 | 9/2017 | Aytug et al. | |
| 2013/0157008 A1 | 6/2013 | Aytug et al. | |
| 2013/0236695 A1 | 9/2013 | Aytug et al. | |
| 2014/0120340 A1 | 5/2014 | Riddle et al. | |
| 2014/0130710 A1* | 5/2014 | Laukkanen | D21H 21/16 106/203.3 |
| 2014/0287243 A1* | 9/2014 | Weber | C09D 127/18 428/422 |
| 2017/0036241 A1* | 2/2017 | Constantinou | C25D 1/20 |
| 2017/0204279 A1 | 7/2017 | Larimer et al. | |
| 2017/0283316 A1 | 10/2017 | Meuler et al. | |
| 2017/0362257 A1 | 12/2017 | Venema | |

OTHER PUBLICATIONS

Simpson, John, et al., Superhydrophobic materials and coatings: a review; IPO Publishing, Rep. Prog. Phys. 78 (2015) 086501 (14 pp.).
International Search Report and Written Opinion, dated Jun. 14, 2019, in International Application No. PCT/US2019/019734.

* cited by examiner

OPTICALLY TRANSPARENT SUPERHYDROPHOBIC THIN FILM

CROSS REFERENCE TO RELATED APPLICATION

This application claims priority to both U.S. Provisional Patent Application No. 62/635,993, filed on Feb. 27, 2018, and U.S. patent application Ser. No. 15/991,873, filed on May 29, 2018; the entire contents of each is hereby incorporated by reference.

BACKGROUND

Unless otherwise indicated herein, the materials described in this section are not prior art to the claims in this application and are not admitted to be prior art by inclusion in this section.

Superhydrophobic surfaces and coatings having exceptional water repellency properties have potential application in numerous fields of endeavor. Well-bonded, optically clear coatings have been achieved, as have optically clear, superhydrophobic coatings. But there remains a need for an easily applied, optically clear, well-bonded, superhydrophobic coating or thin film. This is because the physical properties that can achieve these three characteristics tend to be mutually exclusive when using conventional thin film materials and methods. For example, a superhydrophobic material typically has a micro- to nanometer surface roughness, which tends to scatter light and makes optical clarity difficult to achieve. Likewise, materials with high optical clarity tend to have low surface roughness (i.e., a very smooth surface) and do not usually allow good bonding to low surface energy hydrophobic materials. There further remains a need for superhydrophobic coatings that can retain hydrophobicity after extensive wear.

SUMMARY

In one aspect, the present disclosure provides a method for coating a substrate, the method comprising providing a substrate having a surface; disposing a coating composition adjacent the surface; the composition comprising a hydrophobic fluorinated solvent, a binder comprising a hydrophobic fluorinated polymer, and silica nanoparticles; and evaporating the fluorinated solvent.

In another aspect, the present disclosure provides an article comprising a coating layer, the coating layer having an inward surface and an opposing outward surface, the inward surface disposed adjacent a substrate surface, wherein the coating layer comprises a hydrophobic fluorinated polymer and a plurality of nanoparticles, and at least a portion of the nanoparticles are partially exposed on the outward surface of the coating layer.

These as well as other aspects, advantages, and alternatives will become apparent to those of ordinary skill in the art by reading the following detailed description, with reference where appropriate to the accompanying drawings.

DETAILED DESCRIPTION

Figure 1:
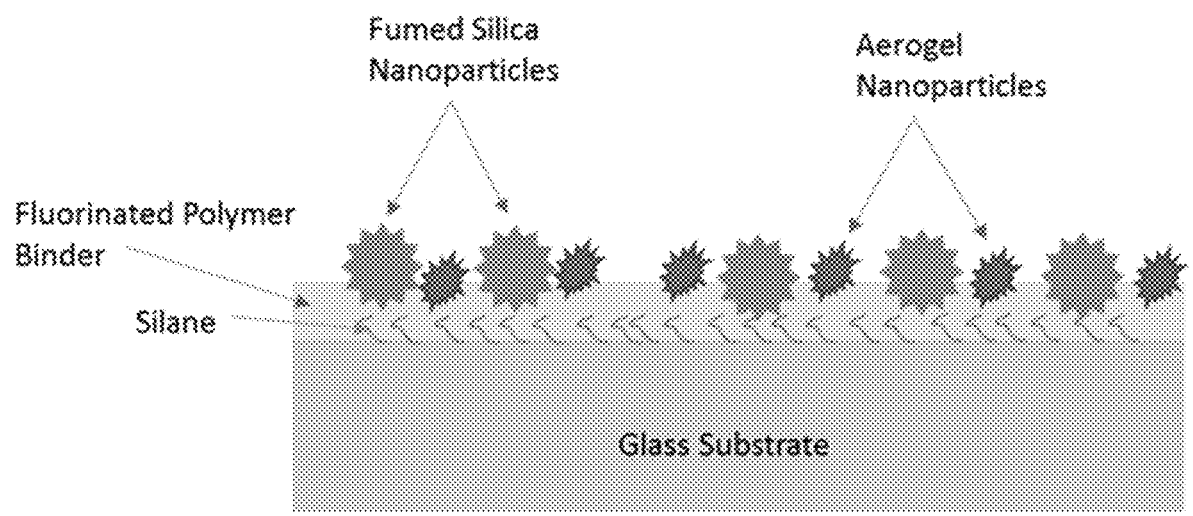
FIG. 1 illustrates a view of an example superhydrophobic optical thin film, including the various thin film layers and associated hydrophobic nanoparticles, according to aspects of the present disclosure.

The following detailed description describes various features and functions of the disclosed methods, compositions, and structures. The illustrative embodiments described herein are not meant to be limiting. It will be readily understood that certain aspects of the disclosed methods, compositions, and structures can be arranged and combined in a wide variety of different configurations, all of which are contemplated herein.

A superhydrophobic composition that is easily applied and well-bonded without sacrificing hydrophobicity or optical transparency is described. "Superhydrophobic," as used herein, describes surfaces or coatings that have a water contact angle of at least about 130°. Also as used herein, an "optically transparent" coating transmits at least about 90% of incident light having a wavelength within the range of 300 nm to 1500 nm. "Well-bonded," as used herein, refers to a composition that, when applied as a coating or thin film to a substrate, adheres to the substrate so as to not be easily removed with relatively small amounts of shear force (e.g., rubbing) or by exposure to environmental conditions (e.g., sun, rain, wind, etc.).

In one aspect, the present disclosure provides a composition including
  a hydrophobic fluorinated solvent;
  a binder comprising a hydrophobic fluorinated polymer;
  hydrophobic fumed silica nanoparticles; and
  optionally, hydrophobic aerogel nanoparticles.

The hydrophobic fluorinated solvent may be a fluorinated material capable of dissolving the binder described herein. To provide good optical clarity of the resulting film or coating, it is beneficial that the composition include particles that are well-dispersed throughout the deposition process. Particles that are too large or poorly dispersed can lead to clouding of the superhydrophobic surface. Desirable dispersion may be achieved by using a suitable hydrophobic fluorinated solvent, which may act as a dispersive agent. In some embodiments, the hydrophobic fluorinated solvent may include a fluorinated alkane, fluorinated trialkylamine, fluorinated cycloalkane, fluorinated heterocycloalkane, or combination thereof. In some embodiments, the fluorinated component may be perfluorinated. Suitable fluorinated solvents are commercially available from a number of sources, such as Sigma Aldrich (St. Louis, Mo.), 3M (Maplewood, Minn.), etc. Suitable fluorinated solvents include perfluorooctane, 2H,3H-perfluoropentane, perfluorotributylamine, perfluorodecalin, and perfluorononane, etc., for example, Fluorinert™ FC-40, Fluorinert™ FC-75, Fluorinert™ FC-770, or an equivalent or similar material.

In some embodiments, the hydrophobic fluorinated solvent may include a cross-linking silane. The cross-linking silane may be selected from cross-linking agents known in the art having at least one silicon atom. Suitable cross-linking silanes are commercially available from a number of sources, such as Sigma Aldrich (St. Louis, Mo.), 3M (Maplewood, Minn.), etc. Suitable cross-linking silanes include, for example, silanes having hydride functionality, vinyl functionality, etc., for example, Novec™ 2702, Novec™ 2202, Novec™ 1720, or equivalent or similar material. When a cross-linking silane is included, the amount of binder used in the composition may be decreased to about 0.3 wt. % to about 1.0 wt. % of the composition.

The fluorinated polymer binder may include a hydrophobic, fluorinated polymer that is capable of being dissolved in the hydrophobic fluorinated solvent described herein. The binder may enable the hydrophobic particles to adhere to the surface of a substrate, but if the binder is not selected properly or is used in the wrong amount, the binder may affect the optical clarity of the resulting film or coating. The fluorinated polymer binder is preferably optically clear and amorphous. In some embodiments, the fluorinated polymer binder may be a fluroalkyl polymer, fluoroalkoxy polymer, perfluoroalkyl polymer, perfluoroalkoxy polymer, or combination thereof. Suitable fluorinated polymer binders are commercially available from a number of sources, such as Solvay (Brussels, Belgium). Suitable fluorinated polymer binders may include, for example, Teflon® AF and Hyflon® AD.

The amount of the binder in the composition is related to the ability of the composition to form a film or coating with the desired superhydrophobic, optical transparency and well-bonded properties described herein. If too much binder is used in the composition, the nanoparticles may be engulfed by the binder to such a degree that the surface loses its nanotexturing and thus its superhydrophobic properties. If too little binder is employed, the nanoparticles may not be effectively bonded to the substrate, and the adherence to the substrate may be affected. In some embodiments, the fluorinated polymer binder is present in about 0.3 wt. % to about 1.5 wt. % of the composition. In other embodiments, the binder is present in about 0.8 wt. % to about 1.2 wt. % of the composition. The binder may also be present in about 0.3 wt. % to about 1.4 wt. %, about 0.4 wt. % to about 1.5 wt. %, about 0.3 wt. % to about 1.3 wt. %, about 0.4 wt. % to about 1.3 wt. %, about 0.4 wt. % to about 1.2 wt. %, about 0. wt. %5 to about 1.2 wt. %, about 0.5 wt. % to about 1.1 wt. %, about 0.5 wt. % to about 1.0 wt. %, about 0.6 wt. % to about 1.0 wt. %, about 0.7 wt. % to about 1.4 wt. %, about 0.5 wt. % to about 1.5 wt. %, about 0.5 wt. % to about 1.2 wt. %, or about 0.3 wt. % to about 0.9 wt. % of the composition.

A variety of fumed silica materials including, for example, fumed silica having varying particle size distributions or average particles sizes, or even surface-treated fumed silica, are known in the art. In certain embodiments as otherwise described herein, the fumed silica nanoparticles are high surface area, nanostructured and/or nanoporous particles with an average particle size of about 200 nm or less. The average fumed silica nanoparticle size represents an average linear dimension of the particles (e.g., an average diameter in the case of substantially spherical particles), and it may represent an average grain or crystallite size, or, in the case of agglomerated particles, an average agglomerate size. In some embodiments, the average fumed silica nanoparticle size may be less than about 100 nm, less than about 75 nm, or less than about 50 nm. However, extremely small fumed silica nanoparticles (e.g., a few nanometers or less) may be difficult to disperse. In some embodiments, the average fumed silica nanoparticle size is from about 10 nm to about 200 nm, from about 25 nm to about 100 nm or from about 40 nm to about 60 nm.

The hydrophobic fumed silica nanoparticles may be silica nanoparticles chemically modified with a hydrophobic silane. In some embodiments, the nanoparticles are chemically treated with a fluorinated material. In other embodiments, the nanoparticles are chemically treated with polydimethylsiloxane (PDMS). Colloidal silicon dioxide made from fumed silica is prepared by a suitable process to reduce the particle size and modify the surface properties. The surface properties are modified to produce fumed silica by production of the silica material under conditions of a vapor-phase hydrolysis at an elevated temperature with a surface modifying silicon compound (e.g., silicon dimethylbichloride). The hydrophobic properties of the fumed silica nanoparticles are a result of treatment with at least one compound selected from the group consisting of organosilanes, fluorinated silanes, and disilazanes.

Suitable organosilanes include, but are not limited to alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, and polytriethoxysilane; trialkoxyarylsilanes; isooctyltrimethoxy-silane; N-(3-triethoxysilylpropyl) methoxyethoxyethoxy ethyl carbamate; N-(3-triethoxysilylpropyl)methoxyethoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinylmethyldiethoxysilane and vinyldimethylethoxysilane.

Suitable fluorinated silanes include fluorinated alkyl-, alkoxy-, aryl- and/or alkylaryl-silanes, and fully perfluorinated alkyl-, alkoxy-, aryl- and/or alkylaryl-silanes. An example of a suitable fluorinated alkoxy-silane is perfluorooctyltrimethoxysilane.

Suitable disilazanes include, for example, hexamethyldisilazane, divinyltetramethyldisilazane and bis(3,3-trifluoropropyl)tetramethyldisilazane. Cyclosilazanes are also suitable, and include, for example, octamethylcyclotetrasilazane.

Suitable hydrophobic fumed silica nanoparticles are commercially available from a number of sources, including Cabot Corporation (Tuscola, Ill.) under the trade name CAB-O-SIL, and Degussa, Inc. (Piscataway, N.J.), under the trade name AEROSIL. Suitable hydrophobic fumed silica particles include, for example, AEROSIL[R]R 202, AEROSIL[R]R 805, AEROSIL[R] R 812, AEROSIL[R]R 812 S, AEROSIL[R] R 972, AEROSIL[R]R 974, AEROSIL[R]R 8200, AEROXIDE [R] LE-1 and AEROXIDE [R] LE-2.

In some embodiments, the hydrophobic fumed silica nanoparticles are present in about 0.01 wt. % to about 0.5 wt. % of the composition. In other embodiments, the hydrophobic fumed silica nanoparticles are present in about 0.08 wt. % to about 0.12 wt. % of the composition. The hydrophobic fumed silica nanoparticles may also be present in about 0.03 wt. % to about 0.5 wt. %, about 0.04 wt. % to about 0.5 wt.

%, about 0.03 wt. % to about 0.4 wt. %, about 0.04 wt. % to about 0.4 wt. %, about 0.04 wt. % to about 0.3 wt. %, about 0.05 wt. % to about 0.2 wt. %, about 0.05 wt. % to about 0.1 wt. %, about 0.05 wt. % to about 0.1 wt. %, about 0.06 wt. % to about 0.1 wt. %, about 0.07 wt. % to about 0.1 wt. %, about 0.05 wt. % to about 0.5 wt. %, about 0.05 wt. % to about 0.3 wt. %, or about 0.01 wt. % to about 0.09 wt. % of the composition.

In some embodiments, the composition may further include hydrophobic aerogel nanoparticles. The combination of hydrophobic fumed silica nanoparticles in conjunction with hydrophobic aerogel nanoparticles may provide a coating or film with additional water repellency. Superhydrophobic coatings that include hydrophobic aerogel nanoparticles but without fumed silica nanoparticles can provide superhydrophobic, optically clear thin films. But these films fall apart with small amounts of shear force. Thus, such coatings are easily destroyed by rubbing, and do not provide prolonged protection to the coated surface. A composition including hydrophobic fumed silica nanoparticles, however, provides a more durable superhydrophobic coating, which can be well bonded to a glass surface. Combining hydrophobic aerogel with hydrophobic fumed silica allows the aerogel to be protected from rubbing shear forces by "hiding" between well-bonded fumed silica nanoparticles (see FIG. 1). The addition of hydrophobic aerogel nanoparticles can further increase the film's superhydrophobic behavior while maintaining good durability.

Suitable hydrophobic aerogel nanoparticles are very high surface area (600-800 $m^2/g$) particles with a density between about 100 and 200 $kg/m^3$ and an average particle size of about 200 nm or less. The average aerogel nanoparticle size represents an average linear dimension of the particles (e.g., an average diameter in the case of substantially spherical particles), and it may represent an average grain or crystallite size, or, in the case of agglomerated particles, an average agglomerate size. In some embodiments, the average aerogel nanoparticle size may be less than about 100 nm, less than about 75 nm, or less than about 50 nm. However, extremely small aerogel nanoparticles (e.g., a few micrometers or less) may be difficult to disperse. In some embodiments, the average aerogel nanoparticle size is from about 10 nm to about 200 nm, from about 25 nm to about 100 nm or from about 40 nm to about 60 nm.

The hydrophobic aerogel nanoparticles may be obtained from a precursor powder that is processed to reduce the average particle size to about 200 nm or smaller. The hydrophobic aerogel nanoparticles may include nanoscale surface asperities, i.e., a nanoscale surface texture characterized by protruding or sharp features separated by recessed features and/or pores at the particle surface. Coating compositions including particles with such nanoscale surface asperities may yield coatings with higher water contact angles and thus enhanced hydrophobicity. As one of ordinary skill in the art would recognize, the scale of the surface texture is smaller than the average size of the particle; generally, surface asperities are at least about 50% smaller. For example, aerogel particles of about 100 nm in average particle size may include surface asperities of about 25 nm in average size or less, and hydrophobic particles of about 50 nm in average particle size may include surface asperities of about 25 nm in size or less.

Suitable aerogel precursor powders are commercially available from a number of sources, including Cabot Corp. (Boston, Mass.). Suitable aerogel precursor powders are sold under the Nanogel® Aerogel, LUMIRA® Aerogel and ENOVA® Aerogel trade names, and include, for example ENOVA™ Aerogel IC 3110, ENOVA™ Aerogel Mont. 1100, ENOVA™ Aerogel Mont. 1200, ENOVA™ Aerogel IC 3120. These porous, nanostructured particles are available in particle sizes ranging from about 5 micrometers to 4 mm, but may be mechanically milled or sonicated as discussed below to obtain particles of reduced sizes (e.g., less than about 50 nm) for use in forming superhydrophobic coatings.

In another aspect, the present disclosure provides a method for making a composition as described herein. The method involves:

(a) combining a hydrophobic fluorinated solvent, a binder comprising a hydrophobic fluorinated polymer, fumed silica nanoparticles, and optionally, hydrophobic aerogel nanoparticles;
(b) mixing the combination; and
(c) drying the mixture to provide the composition.

In embodiments where the composition includes hydrophobic aerogel nanoparticles, the combination may further include hydrophobic aerogel nanoparticles added prior to mixing. Mixing by sonication, (e.g., with a sonic probe) can be used to break up conglomerates of the hydrophobic fumed silica nanoparticles and/or the hydrophobic aerogel nanoparticles, for example, if the conglomerated nanoparticles are large enough to scatter a significant amount of light.

Figure 3:
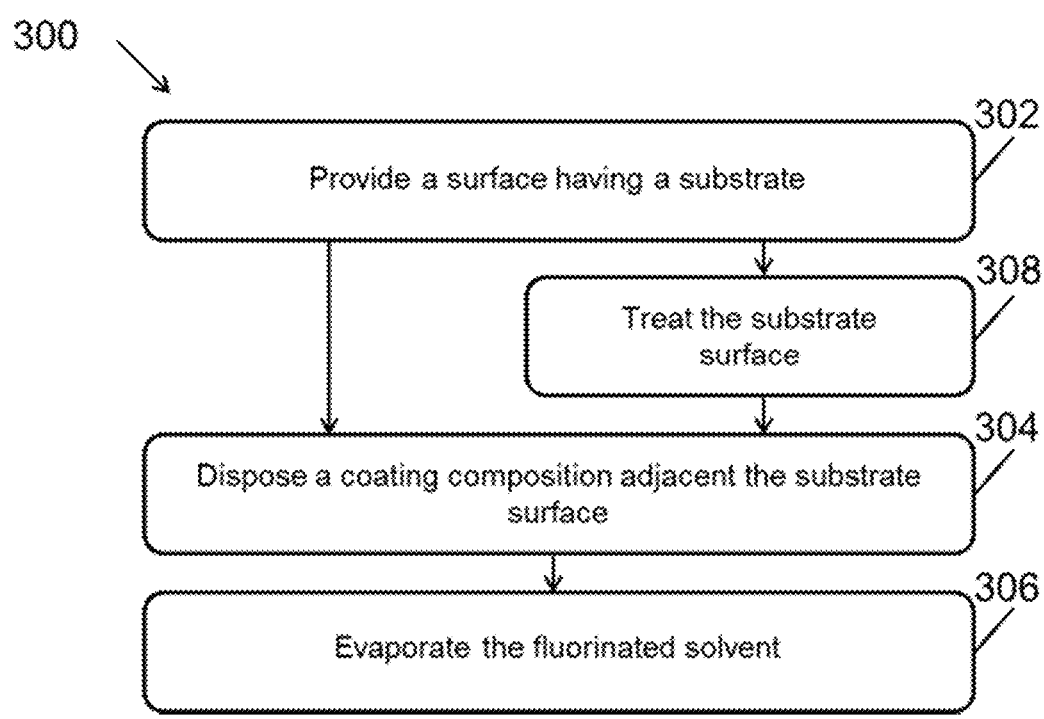
FIG. 3 depicts a flow chart illustrating a method according to example embodiments.

Advantageously, the present inventor has determined such compositions can be easily applied to a substrate to provide a well-bonded, optically clear, hydrophobic coating. Accordingly, another aspect of disclosure is a method for coating a substrate. An example method 300 of coating the substrate is illustrated in FIG. 3. At block 302, the method 300 may include providing a substrate having a surface, and at block 304, disposing a coating composition adjacent the surface. In certain embodiments, the method 300 may include at block 308 treating the substrate before disposing the coating composition at block 304. The composition comprises a hydrophobic fluorinated solvent, a binder comprising a hydrophobic fluorinated polymer, and hydrophobic fumed silica nanoparticles. At block 306, the method may further include evaporating the fluorinated solvent.

The amounts and identities of the various components can be as otherwise described above with respect to the compositions of the disclosure. For example, in certain embodiments as otherwise described herein, the coating composition further comprises hydrophobic aerogel nanoparticles.

Accordingly, in certain embodiments as otherwise described herein, the binder is present in the coating composition in an amount within the range of 0.3 wt. % to 1.5 wt %. For example, in certain such embodiments, the binder is present in an amount within the range of 0.5 wt. % to 1.5 wt. %, or 0.8 wt. % to 1.5 wt. %, or 0.3 wt. % to 1.2 wt. %, or 0.8 wt. % to 1.2 wt. % of the coating composition. In certain embodiments as otherwise described herein, the silica nanoparticles are present in the coating composition in an amount within the range of 0.01 wt. % to 0.5 wt. %. For example, in certain such embodiments, the silica nanoparticles are present in an amount within the range of 0.03 wt. % to 0.5 wt. %, or 0.05 wt. % to 0.5 wt. %, or 0.08 wt. % to 0.5 wt. %, or 0.01 wt. % to 0.4 wt. %, or 0.01 wt. % to 0.25 wt. %, or 0.01 wt. % to 0.12 wt. %, or 0.03 wt. % to 0.4 wt. %, or 0.05 wt. % to 0.25 wt. %, or 0.08 wt. % to 0.12 wt. % of the coating composition. In certain embodiments as otherwise described herein, the aerogel nanoparticles are present in the coating composition in an amount within the range of 0.1 wt. % to 0.5 wt. %. For example, in certain such embodiments, the aerogel nanoparticles are present in an amount within the range of 0.2 wt. % to 0.5 wt. %, or 0.3 wt. % to 0.5 wt. %, or 0.1 wt. % to 0.4 wt. %, or 0.1 wt. % to 0.3 wt. %, or 0.15 wt. % to 0.45 wt. % of the coating composition.

For example, in certain embodiments as otherwise described herein, the average size of the silica nanoparticles, or the average size of the silica nanoparticles and aerogel nanoparticles, is within the range of 10 nm to 200 nm, or 25 nm to 200 nm, or 50 nm to 200 nm, or 100 nm to 200 nm, or 10 nm to 150 nm, or 10 nm to 100 nm, or 10 nm to 50 nm, or 25 nm to 150 nm, or 50 nm to 100 nm. In some examples, it may be desirable to have the average size of the silica nanoparticles and aerogel nanoparticles equal to 10% or less of the electromagnetic radiation wavelength (i.e., radio waves and/or light), in order to make the particles transparent to the electromagnetic radiation.

In certain embodiments as otherwise described herein, disposing the coating composition comprises spraying the composition onto the substrate surface. Advantageously, the present inventors have determined that unlike other well bonded, superhydrophobic, optically transparent thin films known in the art, a sprayable composition as otherwise described herein can be easily handled and applied. While conventional compositions are often applied with complicated, expensive, and cumbersome processes such as physical vapor deposition, the composition described herein may be applied to the substrate by, for example, spray coating, spin coating, or dip coating, or by any other deposition techniques known in the art. Typically, the composition is deposited onto a clear substrate formed of an optically transparent material, such as glass or acrylic, although other substrates may be used.

In certain embodiments as otherwise described herein, evaporating the fluorinated solvent comprises air drying or heating the substrate and/or deposited composition at a temperature above the boiling point of the fluorinated solvent. For example, when Fluorinert™ FC-40 (b.p. of 165° C.) is used as the fluorinated solvent, the substrate may be heated to a temperature in excess of 165° C. to promote the evaporation of the fluorinated solvent.

As described above, a cross-linking silane can be included in the coating composition. In certain such embodiments, the method further comprises curing the disposed coating composition. In certain embodiments as otherwise described herein, curing the disposed coating composition comprises heating the disposed composition to a temperature sufficient to provide a cross-linked coating. For example, in certain such embodiments, the method includes disposing a coating composition comprising a cross-linking silane adjacent a substrate surface, and curing the disposed coating composition at a temperature of at least 150° C., or at least 175° C., or at least 200° C. for a period of time sufficient to provide a cross-linked coating composition. In certain such embodiments, the method includes curing the coating composition for a period of time within the range of 30 min. to 90 min., or 45 min. to 90 min., or 60 min. to 90 min, or 30 min. to 75 min., or 30 min. to 60 min, or 45 min. to 75 min. For example, in certain embodiments as otherwise described herein, curing the disposed coating composition comprises heating the disposed composition to a temperature sufficient to provide a cross-linked coating (e.g., a temperature of at least 150° C.) for about 60 min.

In certain embodiments as otherwise described herein, the method includes treating the substrate (for example, at block 308 of method 300). For example, in certain such embodiments, treating the substrate comprises depositing a silane on at least a portion of the substrate surface (i.e., before disposing the coating composition). In another example, in certain embodiments as otherwise described herein, treating the substrate comprises plasma etching the substrate. In certain such embodiments, plasma etching the substrate generates hydroxyl functional groups on the substrate surface.

Advantageously, the present inventors have determined that treating the substrate surface and/or disposing a coating composition including a cross-linking silane can improve adhesion of the coating composition to the substrate (e.g., where the substrate is a highly hydrophilic material such as glass). In certain embodiments as otherwise described herein, a coating composition including a cross-linking silane is disposed adjacent an untreated substrate surface (e.g., a surface lacking significant hydroxyl-group functionality and/or silane functionality). In other embodiments, a coating composition lacking a cross-lining silane is disposed adjacent a treated substrate surface (e.g., a plasma-etched and/or silane-functionalized surface). Of course in certain embodiments as otherwise described herein, a coating composition including a cross-linking silane is disposed adjacent a treated substrate surface (e.g., a plasma-etched surface).

Another aspect of the disclosure is a coated substrate prepared by a method as described herein. For example, in certain embodiments, the coated substrate is a structure including a substrate and a superhydrophobic coating on at least a portion of the substrate. When the coating is on the substrate, the resulting film is superhydrophobic, optically clear and well-bonded to the substrate. The superhydrophobic coating may have a water contact angle of at least 130°. In in certain such embodiments, the superhydrophobic coating has a water contact angle of at least 150°. For example, the water contact angle may be at least 130°, at least 135°, at least 140°, at least 145°, at least 150°, at least 155°, at least 160°, at least 165°, at least 170° or at least 175°. In some embodiments, the water contact angle encompasses both advancing and receding water contact angles.

In some embodiments, the superhydrophobic coating may have a light transmission of at least 95% for wavelengths between 300 nm and 1500 nm, or for visible wavelengths between 400 nm and 700 nm. The substrate may also be an optically transparent material such as glass or plastic. In embodiments where the substrate is also optically transparent, the coated substrate allows light (e.g., from a laser or optical sensor) to be transmitted through the substrate and the superhydrophobic coating with limited interference. The superhydrophobic nature of the coating may also enable the substrate to stay clean and dry by limiting the ability for water (e.g., rain) and dirt or dust from accumulating on the surface.

The superhydrophobic coating may also adhere to the substrate in a manner that does not allow it to be removed by rubbing or by exposure to environmental conditions (e.g., sun, rain, wind, etc.). This aspect of the superhydrophobic coating allows a single application to remain on the substrate for a prolonged period of time, and is a characteristic not previously known for a superhydrophobic, optically transparent coating.

In some embodiments, the structure further comprises a silane layer disposed between the superhydrophobic coating and the substrate. The silane may be employed to modify the surface energy or wettability of the surface of the substrate prior to the application of the superhydrophobic composition. The silane may be a silicon-containing compound having linear alkyl, branched alkyl, or aryl groups, including dipodal silanes, and may be optionally fluorinated. In some embodiments, the silane is a hydrophobic silane. Suitable silanes include, for example, organoethoxysilane, trimethoxysilane, (perfluorobutyl)ethyltriethoxysilane, (3,3,3-trifluoropropyl)trimethoxysilane, and any silane described herein When the fluorinated solvent includes a cross-linking silane, however, the fluorinated silane layer may not be necessary.

Another aspect of the disclosure is an article comprising a coating layer, the coating layer having an inward surface and an opposing outward surface, the inward surface disposed adjacent a substrate surface. The coating layer comprises a hydrophobic fluorinated polymer and a plurality of nanoparticles, and at least a portion of the nanoparticles are partially exposed on the outward surface of the coating layer. In certain embodiments, the coating layer is the dried product of a coating composition as otherwise described herein. Accordingly, in such embodiments, the amounts and identities of the various components can be as otherwise described above with respect to the compositions of the disclosure.

For example, in certain embodiments as otherwise described herein, the nanoparticles are selected from one or more of silica nanoparticles and aerogel nanoparticles. In certain such embodiments, the average size of the nanoparticles is within the range of 10 nm to 200 nm. For example, in certain embodiments as otherwise described herein, the nanoparticles are selected from one or more of silica nanoparticles and aerogel nanoparticles, and have an average size within the range of 10 nm to 200 nm, or 25 nm to 200 nm, or 50 nm to 200 nm, or 100 nm to 200 nm, or 10 nm to 150 nm, or 10 nm to 100 nm, or 10 nm to 50 nm, or 25 nm to 150 nm, or 50 nm to 100 nm.

In certain embodiments as otherwise described herein, the nanoparticles are dispersed relatively evenly throughout the coating layer. In other embodiments, the nanoparticles are localized on the outward surface of the coating layer (e.g., the product of depositing nanoparticles onto the surface of the coating layer).

Figure 2:
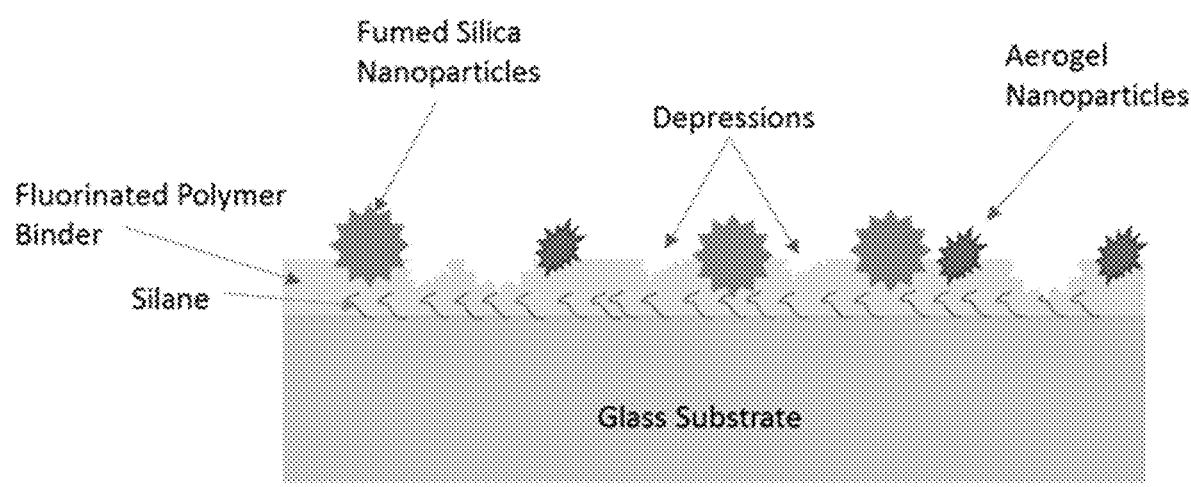
FIG. 2 illustrates a view of an example superhydrophobic optical thin film, including the various thin film layers, associated hydrophobic nanoparticles, and depressions from displaced nanoparticles, according to aspects of the present disclosure.

In certain aspects, nanoparticles partially exposed on the outward surface of the coating layer can be displaced from the coating layer, for example, due to subjection to weather, providing a corresponding depression in the outward surface of the coating layer (see FIG. 2). The present inventor has advantageously determined that such depressions, which have an average size on the scale of the nanoparticles of the coating layer, can provide a hydrophobic nano-textured surface (e.g., alone or in combination with partially exposed nanoparticles).

Accordingly, in certain embodiments as otherwise described herein, the outward major surface of the coating layer further comprises a plurality of depressions. In certain such embodiments, the average size of the depressions is within the range of 10 nm to 200 nm, or 25 nm to 200 nm, or 50 nm to 200 nm, or 100 nm to 200 nm, or 10 nm to 150 nm, or 10 nm to 100 nm, or 10 nm to 50 nm, or 25 nm to 150 nm, or 50 nm to 100 nm.

In certain embodiments as otherwise described herein, the coating layer further comprises a cross-linked silane (e.g., the product of curing a coating composition comprising a cross-linking silane). In certain embodiments as otherwise described herein, the substrate comprises a plurality of hydroxyl groups (e.g., the product of plasma etching a substrate surface). In certain embodiments as otherwise described herein, the substrate surface comprises a fluorinated silane (e.g., the product of depositing a silane onto a substrate surface). In certain embodiments as otherwise described herein, the outward major surface of the article has a water contact angle of at least 130°. For example, in certain such embodiments, the outward major surface has a water contact angle of at least 135°, or at least 140°, or at least 150°, or at least 155°, or at least 160°.

In certain embodiments, light transmission through the coating layer of the article is at least 95% for wavelengths within the range of 300 nm to 1500 nm, or for visible wavelengths within the range of 400 nm to 700 nm. In certain embodiments as otherwise described herein, the substrate may also be an optically transparent material, such as, for example, glass or plastic. In certain embodiments, the substrate is optically transparent, and the coating layer and substrate allow light (e.g., from a laser or optical sensor) to be transmitted through the substrate and the coating layer with relatively little interference (e.g., effectively no interference).

EXAMPLES

Example 1: Formation of a Superhydrophobic Composition

An amorphous fluoropolymer binder is dissolved in a fluorinated solvent. Hydrophobic fumed silica nanoparticles are added. Optionally, hydrophobic aerogel nanoparticles are added. The mixture is mixed with a sonic probe to break up conglomerates of the hydrophobic fumed silica particles and the hydrophobic aerogel particles, and dried to provide the desired material. Table 1 lists example compositions and the amounts of each component as weight percent of the composition.

TABLE 1

Example Compositions

| Composition No. | Fluorinated Solvent | Fluoropolymer Binder | Hydrophobic Fumed Silica Nanoparticles | Hydrophobic Aerogel Nanoparticles |
| --- | --- | --- | --- | --- |
| A | Fluorinert ™ FC-40 | Hyflon ® AD (1.0%) | Aerosil ® (0.5%) | ENOVA ® Aerogel IC3100 (0.3%) |
| B | Fluorinert ™ FC-40 | Hyflon ® AD (0.6%) | Aerosil ® (0.3%) | ENOVA ® Aerogel IC3100 (0.2%) |
| C | Fluorinert ™ FC-40 | Hyflon ® AD (0.5%) | Aerosil ® (0.3%) | ENOVA ® Aerogel IC3100 (0.2%) |
| D | Fluorinert ™ FC-40 | Hyflon ® AD (0.3%) | Aerosil ® (0.15%) | ENOVA ® Aerogel IC3100 (0%) |

Example 2: Superhydrophobic Coating Method

A hydrophobic silane is added to a mixture of a trace amount of water and isopropyl alcohol or acetone to provide a 1 vol. % silane solution. An optionally plasma etched glass wafer is soaked in the solution, and then air-dried before heating in an oven at about 100° C. for about 15-20 min. to provide a silane-functionalized surface.

A 1-2 wt. % coating solution of an amorphous fluoropolymer binder is prepared in a fluorinated solvent by stirring the binder powder and solvent at about 50° C. for about 10 min. to provide an optically clear, completely dissolved fluoropolymer solution. The solution is spin-coated onto the silane-functionalized wafer to provide a 150-450 nm coating. The coated wafer is air-dried before heating in an oven at about 200° C. for about 60 min.

A nanoparticle coating solution including 0.1 wt. % aerogel nanoparticles and 0.2 wt. % silica nanoparticles is prepared in the 1-2 wt. % fluoropolymer coating solution by mixing with a sonic probe in 30 minute increments until the nanoparticles are sufficiently dispersed. The nanoparticle solution is sprayed onto the coated wafer to provide 50-75-nm nanoparticles partially embedded in the coating layer. The wafer is then air-dried before heating in an oven at about 200° C. for about 60 min.

The index of refraction of the resulting coating is about 1.33, and the water contact angle of the coating is about 165°.

Example 3: Superhydrophobic Coating Method

A coating solution of 2 wt. % of fluoropolymer binder and cross-linking silane in a fluorinated solvent is spin-coated onto a plasma-etched glass wafer to provide a 150-450 nm coating. The coated wafer is air-dried before heating in an oven at about 150° C. for about 60 min. to provide a cross-linked coating layer.

A nanoparticle coating solution including 0.1 wt. % aerogel nanoparticles and 0.2 wt. % silica nanoparticles is prepared in the 2 wt. % fluoropolymer/cross-linking silane coating solution by mixing with a sonic probe for about 3 hours, until the nanoparticles are sufficiently dispersed. The nanoparticle solution is sprayed onto the coated wafer to provide nanoparticles partially embedded in coating layer. The wafer is air-dried and then heated in an oven at about 150° C. for about 60 min.

The index of refraction of the resulting coating is about 1.41.

Example 4: Superhydrophobic Coating Method

A layer of fluoropolymer binder is deposited onto an optionally plasma-etched glass wafer using physical vapor deposition (PVD). Following deposition, a nanoparticle coating solution according to Examples 2 or 3 isسprayed onto the coated wafer to provide nanoparticles partially embedded in the coating layer. The wafer is air-dried and then heated in an oven at 150-200° C. for 60 min.

Example 5: Extreme Weathering of Coating

The coated wafer of Example 2 is subjected to simulated rainfall and wind for an extended period of time. A portion of the partially embedded nanoparticles are displaced from the coating, resulting in a surface comprising the remaining partially embedded nanoparticles and nano-scaled depressions (see FIG. 2). The surface after weathering remains superhydrophobic, with a water contact angle of about 135°.

It should be understood that arrangements described herein are for purposes of example only. As such, those skilled in the art will appreciate that other arrangements and other elements can be used instead, and some elements may be omitted altogether according to the desired results.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

The invention claimed is:

1. A method for coating a substrate, the method comprising providing a substrate having a surface;
    disposing a coating composition adjacent the surface; the composition comprising
        a hydrophobic fluorinated solvent;
        a binder comprising a hydrophobic fluorinated polymer; and
        hydrophobic fumed silica nanoparticles;
        hydrophobic aerogel nanoparticles, wherein the average size of the aerogel nanoparticles is within the range of 10 nm to 200 nm; and
    evaporating the fluorinated solvent.

2. The method of claim 1, wherein
    the binder is present in an amount within the range of 0.3 wt. % to 1.5 wt. % of the composition;
    the silica nanoparticles are present in an amount within the range of 0.01 wt. % to 0.5 wt. % of the composition; and
    the aerogel nanoparticles are present in an amount within the range of 0.1 wt. % to 0.5 wt. % of the composition.

3. The method of claim 1, wherein the average size of the silica nanoparticles is within the range of 10 nm to 200 nm.

4. The method of claim 1, wherein the coating composition further comprises a crosslinking silane.

5. The method of claim 4, further comprising curing the disposed coating composition.

6. The method of claim 1, further comprising treating the surface before disposing the coating composition.

7. The method of claim 6, wherein treating the surface comprises plasma etching.

8. The method of claim 6, wherein treating the surface comprises depositing a silane on the surface.

* * * * *